(12) United States Patent
Theobald

(10) Patent No.: US 10,114,372 B1
(45) Date of Patent: *Oct. 30, 2018

(54) METHOD AND APPARATUS FOR TRANSPORTING A PAYLOAD

(71) Applicant: Daniel Theobald, Somerville, MA (US)

(72) Inventor: Daniel Theobald, Somerville, MA (US)

(73) Assignee: VECNA TECHNOLOGIES, INC., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,675

(22) Filed: May 2, 2016

Related U.S. Application Data

(63) Continuation of application No. 14/143,175, filed on Dec. 30, 2013, now Pat. No. 9,352,745.

(51) Int. Cl.
| | |
|---|---|
| *G05B 19/418* | (2006.01) |
| *G05B 19/416* | (2006.01) |
| *G05D 1/00* | (2006.01) |
| *G05D 1/02* | (2006.01) |
| *B60W 30/00* | (2006.01) |

(Continued)

(52) U.S. Cl.
CPC .......... *G05D 1/0088* (2013.01); *B60W 30/00* (2013.01); *B62D 33/00* (2013.01); *G05B 19/416* (2013.01); *G05B 19/4189* (2013.01); *G05B 19/41895* (2013.01); *G05D 1/0016* (2013.01); *G05D 1/0094* (2013.01); *G05D 1/0246* (2013.01); *B60P 1/6445* (2013.01); *G05B 2219/2638* (2013.01); *G05D 2201/0216* (2013.01); *Y02P 90/02* (2015.11); *Y10S 901/01* (2013.01)

(58) Field of Classification Search
CPC ............ G05B 19/416; G05B 19/41895; G05B 19/4189; G05B 2219/2638; B60W 30/00; G05D 1/0246; G05D 2201/0216; G05D 1/0094; G05D 1/0088; G05D 1/0016; Y10S 901/01; B62D 33/00; B60P 1/6445; Y02P 90/02
See application file for complete search history.

(56) References Cited

U.S. PATENT DOCUMENTS

| | | | | |
|---|---|---|---|---|
| 5,192,844 A | * | 3/1993 | Todd ..................... | B23K 3/033 219/85.16 |
| 6,494,143 B1 | * | 12/2002 | Bolonkin ................. | B61B 7/00 104/173.1 |

(Continued)

*Primary Examiner* — Russell Frejd

(57) ABSTRACT

A method and apparatus for transporting a payload carrying device is disclosed. The method comprises providing at least one payload carrying device, a vehicle for transporting the at least one payload carrying device, a connection device for connecting the vehicle and the at least one payload carrying device, at least one sensor device for capturing information regarding the vehicle's surrounding environment, and a control unit for operating the connection device autonomously to connect the vehicle and the at least one payload carrying device where, once connected, the weight of the at least one payload carrying device rests directly on the floor and the vehicle autonomously transports the at least one payload carrying device to a desired location, and operating the connection device autonomously to disconnect the vehicle and the at least one payload carrying device at the desired location where the at least one payload carrying device is immobilized.

20 Claims, 5 Drawing Sheets

(51) Int. Cl.
*B62D 33/00* (2006.01)
*B60P 1/64* (2006.01)

(56) References Cited

U.S. PATENT DOCUMENTS

| | | | | |
|---|---|---|---|---|
| 6,535,793 B2* | 3/2003 | Allard | ................... | B25J 9/1689 |
| | | | | 318/628 |
| 6,813,557 B2* | 11/2004 | Schmidt | ............... | A01B 69/007 |
| | | | | 348/335 |
| 6,845,297 B2* | 1/2005 | Allard | ................... | B25J 9/1689 |
| | | | | 318/628 |
| 7,163,179 B1* | 1/2007 | Taylor | .................. | B64G 1/1078 |
| | | | | 244/159.2 |
| 7,341,266 B2* | 3/2008 | Bridges | ................... | B25J 5/007 |
| | | | | 280/15 |
| 8,446,457 B2* | 5/2013 | Theobald | ........... | H04N 5/23238 |
| | | | | 348/36 |
| 8,473,140 B2* | 6/2013 | Norris | ...................... | B60T 7/22 |
| | | | | 701/23 |
| 2010/0247275 A1* | 9/2010 | Karlen | ................ | B65D 88/022 |
| | | | | 414/286 |
| 2012/0103705 A1* | 5/2012 | Schlee | .................... | B25J 5/007 |
| | | | | 180/14.1 |
| 2013/0140801 A1* | 6/2013 | Schlee | .................... | B60B 39/00 |
| | | | | 280/762 |

\* cited by examiner

METHOD AND APPARATUS FOR TRANSPORTING A PAYLOAD

RELATED APPLICATIONS

This application is a continuation of U.S. patent application Ser. No. 14/143,175 filed Dec. 30, 2013, now issued U.S. Pat. No. 9,352,745, which is incorporated by reference in its entirety.

BACKGROUND OF THE INVENTION

Field of the Invention

The present invention relates to a method and apparatus for transporting a payload and, more specifically, to a method and apparatus for transporting a payload with a vehicle.

Background Information

Using vehicles to transport payloads is useful in a variety of applications. Techniques for transporting payloads include towing the payload behind the vehicle and carrying the payload on the vehicle, among others. These existing techniques, however, lead to difficulty in controlling the vehicle or subject the vehicle to the payload's weight and may cause the vehicle's performance to suffer.

SUMMARY OF THE INVENTION

A method and apparatus for transporting a payload carrying device is disclosed. The method comprises providing at least one payload carrying device, a vehicle for transporting the at least one payload carrying device, a connection device for connecting the vehicle and the at least one payload carrying device, at least one sensor device for capturing information regarding the vehicle's surrounding environment, and a control unit for operating the connection device autonomously to connect the vehicle and the at least one payload carrying device where, once connected, the weight of the at least one payload carrying device rests directly on the floor and the vehicle autonomously transports the at least one payload carrying device to a desired location, and operating the connection device autonomously to disconnect the vehicle and the at least one payload carrying device at the desired location where the at least one payload carrying device is immobilized.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

Figure 1:
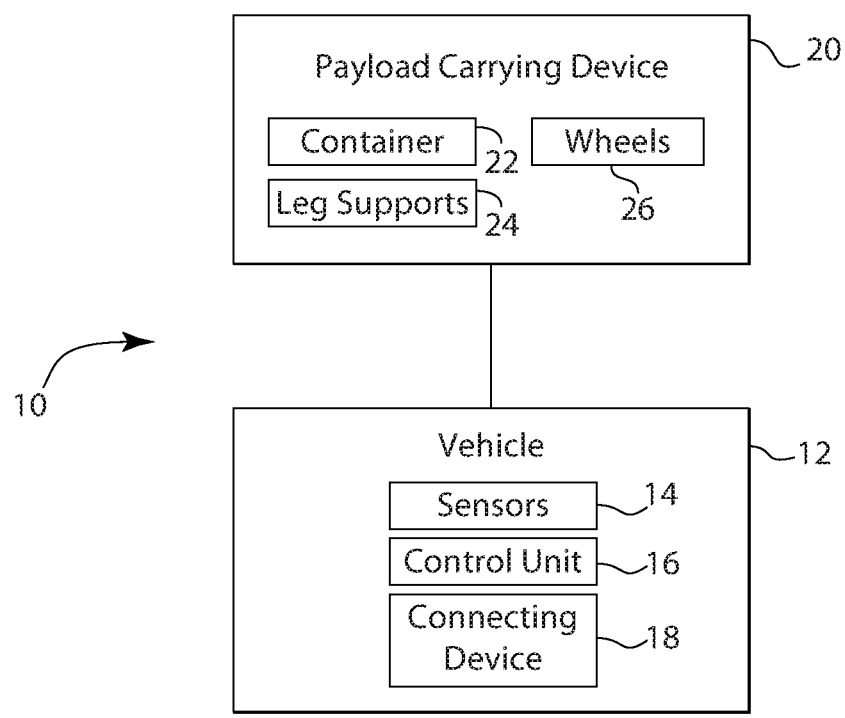
FIG. 1 generally illustrates a diagram of an apparatus in accordance with one embodiment of the invention.
Figure 2A:
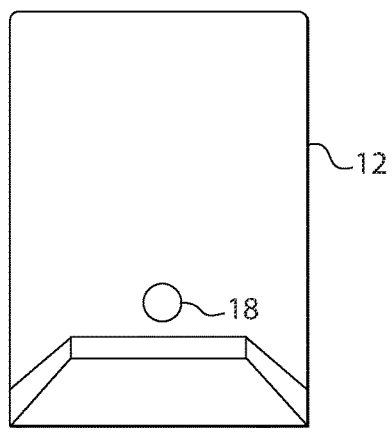
FIGS. 2a-d generally illustrate various views of a vehicle in accordance with one embodiment of the invention.
Figure 2B:
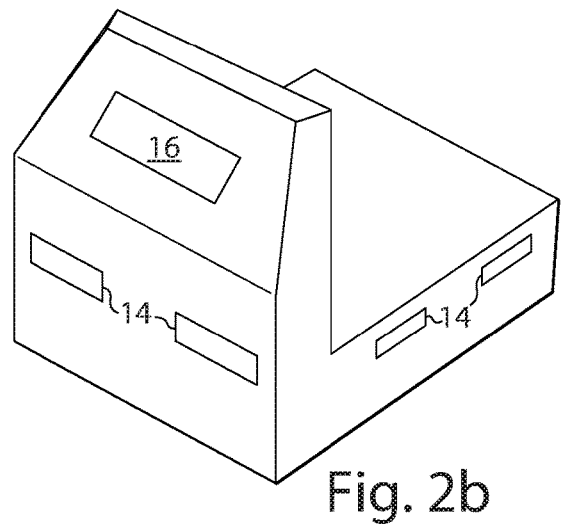
Figure 2C:
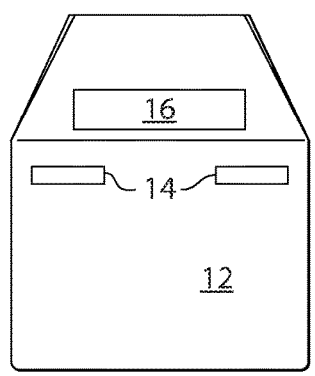
Figure 2D:
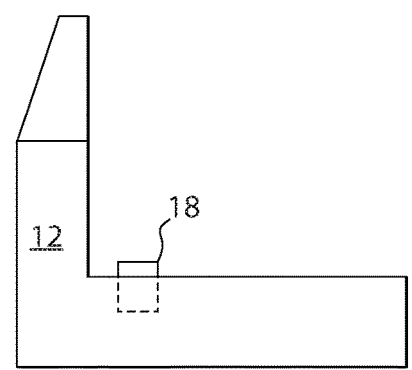
Figure 3A:
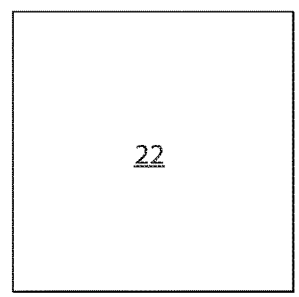
FIGS. 3a-d generally illustrate various views of a payload carrying device in accordance with one embodiment of the invention.
Figure 3B:
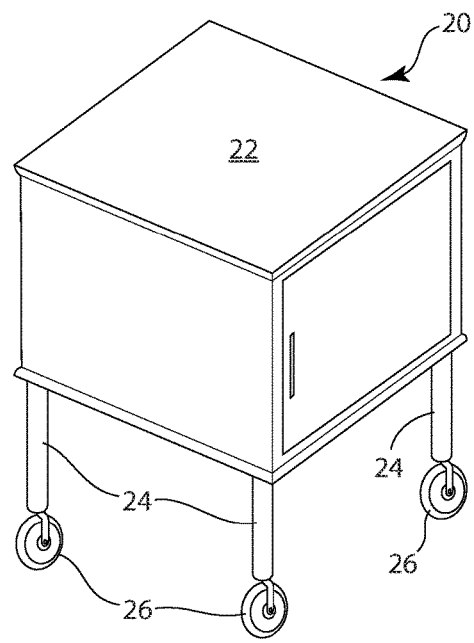
Figure 3C:
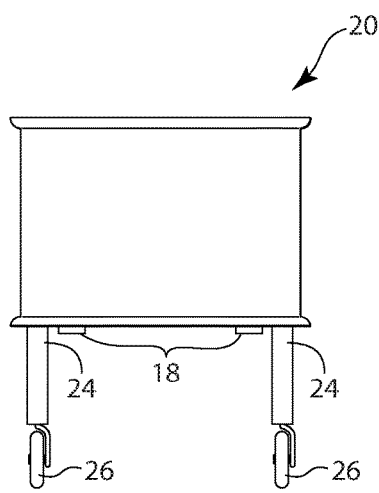
Figure 3D:
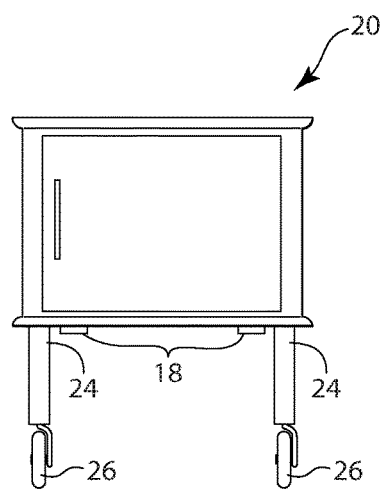

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference letters are employed for designating the same elements throughout the figures.

Transporting payloads, such as goods or the like, is essential in a variety of applications. Whether the payload is being transported by trucks or by other vehicles in different environments, it is desirable for the payload to be transported easily and efficiently.

One existing technique for transporting a payload is to place the payload directly on the vehicle. With this existing technique, however, the weight of the payload may be damaging to the vehicle or cause the vehicle's performance to suffer.

Specifically, some existing techniques may involve a user positioning a payload, with wheels, above a vehicle and then having the vehicle lift the payload off the ground. This existing technique, however, relies on user operation and may require a complex system of gears or other lifting mechanisms for lifting the payload and, if the weight of the payload exceeds the weight limit of the vehicle or lifting mechanisms, the payload may cause damage to the vehicle or the lifting mechanisms.

The present invention is directed towards a method and apparatus for transporting a payload carrying device with a vehicle without the consequences mentioned above. In the present invention the payload carrying device may be autonomously connected and disconnected with the vehicle and, when connected and transported, may maintain contact with the floor so the weight of the payload carrying device rests on the floor. The payload carrying device may also be immobilized when disconnected from the vehicle to prevent unwanted movement.

FIG. 1 generally illustrates a diagram of an apparatus 10 in accordance with one embodiment of the present invention. The apparatus 10 may include a vehicle 12 that may be equipped with sensors 14, a control unit 16, and at least one connection device 18. The vehicle 12 may be configured to connect with a payload carrying device 20 that may be equipped with a container 22, leg supports 24, and wheels 26.

Briefly, in operation, the vehicle 12 may autonomously move to where the payload carrying device 20 is located. Once in a position in which the vehicle 12 can connect with the payload carrying device 20, the control unit 16 may activate the connection device 18 to connect the vehicle 12 with the payload carrying device 20.

The vehicle 12 may then transport the payload carrying device 20 to a desired location and then disconnect from the payload carrying device 20 once at the desired location. Once disconnected from the vehicle 12, the payload carrying device 20 may be immobilized to prevent unwanted movement.

FIGS. 2*a-d* generally illustrate various views of the vehicle 12 in accordance with one embodiment of invention. In one embodiment, the vehicle 12 may be a mobile robot that can be controlled by a user or can be autonomous. The vehicle 12 may be in a health care facility (e.g., to transport medicine or equipment) or in any number of environments in which a payload needs to be transported.

The sensors 14 may include any type of camera device that can capture information regarding the environment surrounding the vehicle 12. For example, the sensors 14 may be cameras such as those described in detail in Applicant's allowed patent application Ser. No. 12/626,990, now issued U.S. Pat. No. 8,446,457 entitled "System for Providing Camera Views" the disclosure of which is hereby incorporated by reference.

The number of and positions of the sensors 14 may vary as long as they can capture information regarding the environment, such as where the payload carrying device 20 is located. In one embodiment, for example if the vehicle 12 is user operated, the sensors 14 may not even be required.

The control unit 16 may be in communication with at least the vehicle 12, the sensors 14, and the connection device 18. In the context of this invention, the control unit 16 may include a computer device with microprocessors and memory and equipped to execute hardware, software, or any combination of hardware and software. However, the control unit 16 may be any type of configuration as along as it accomplishes the various features of the invention, and may be positioned at a location remote from the vehicle 12.

The connection device 18 may be activated to connect and disconnect the vehicle 12 with the payload carrying device 20. Although one connection device 18 is shown in FIGS. 2*a-d*, the number of and positions of the connection devices 18 may vary. For example, using only one connection device 18 may create a more flexible connection (i.e., allow for a certain amount of "give" or flexibility between the vehicle 12 and the payload carrying device 20 in case of a collision), while several connection devices may create a more rigid connection between the vehicle 12 and the payload carrying device 20.

In one embodiment, the connection device 18 may be a rod-like device that may, when activated, protrude out of the vehicle 12 and into an opening of the payload carrying device 20. Additionally and alternatively, the connection device 18 may be a hook or magnet device. The exact configuration of the connection device 18 may vary as long as it can connect the vehicle 12 with the payload carrying device 20 to accomplish the various features of the invention.

It is also contemplated that the connection device 18 need not only be positioned on the vehicle 12. That is, the connection device 18 may be positioned on the vehicle 12, the payload carrying device 20, or any combination thereof.

Regardless of the number of or type of connection device 18, the connection device 18 may be activated autonomously. For example, in one embodiment, the sensors 14 may receive and communicate information to the control unit 16 regarding the environment surrounding the vehicle 12, including when the vehicle 12 is in a position in which it can connect with the payload carrying device 20. The control unit 16 may then activate the connection device 18 to connect the vehicle 12 and the payload carrying device 20.

Additionally and alternatively, a user may control the connection device 18. For example, a user may activate the connection device manually or remotely.

FIGS. 3*a-d* generally illustrate various views of the payload carrying device 20 in accordance with one embodiment of the invention. As can readily be seen, the payload carrying device 20 may include a container 22 for storing a payload and a plurality of leg supports 24 with wheels 26. The payload carrying device 20 may also include areas in which it can receive connection devices 18 and also be equipped with connection devices 18.

Figure 4:
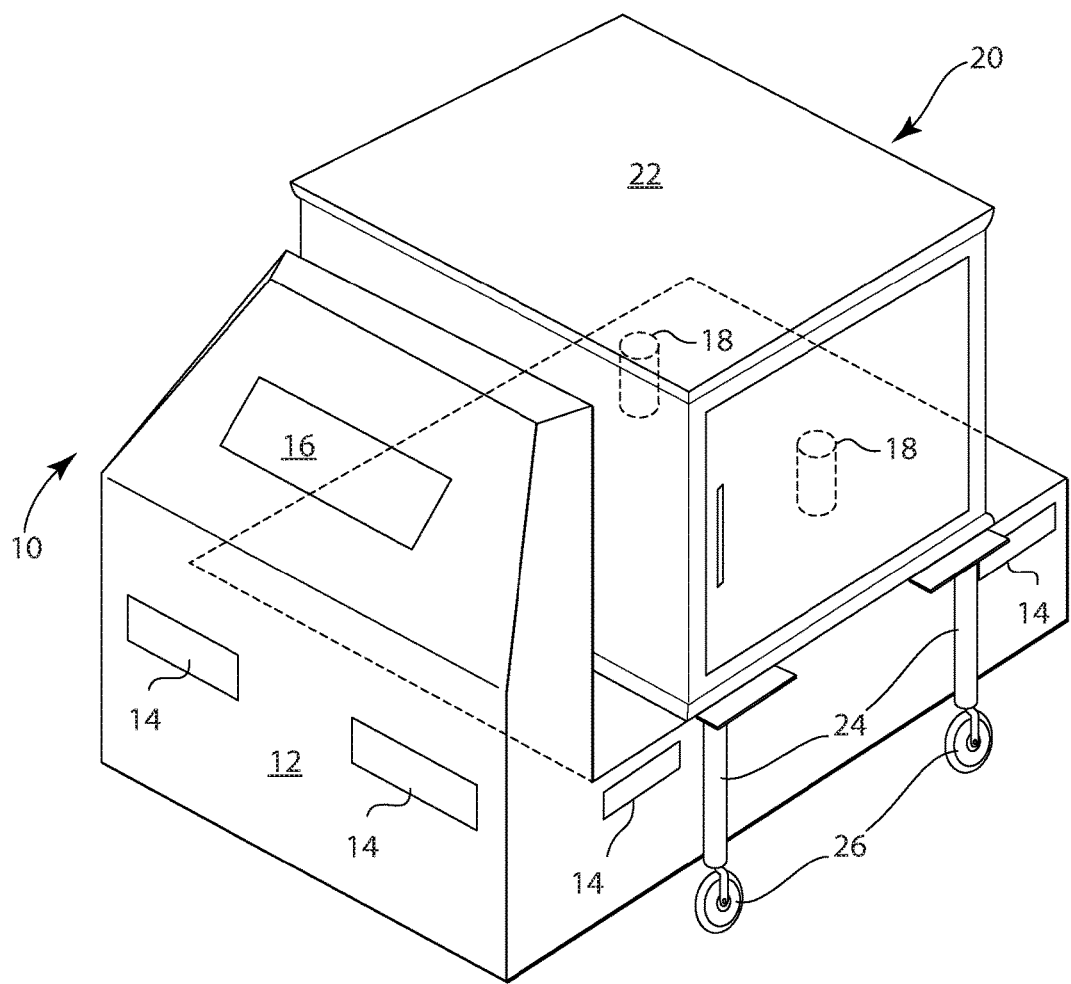
FIG. 4 generally illustrates a vehicle connected with a payload carrying device in accordance with one embodiment of the invention.

FIG. 4 generally illustrates the vehicle 12 and the payload carrying device 20 when connected (by two connection devices 18) in accordance with one embodiment of the invention. As stated previously, the vehicle 12 and the payload carrying device 20 may be connected autonomously and the vehicle 12 may then transport the payload carrying device 20 to a desired location. Once at the desired location, the vehicle 12 and payload carrying device 20 may be disconnected autonomously and the payload carrying device 20 may be immobilized by a locking mechanism (not shown in FIG. 4), and the vehicle 12 may then travel to and transport another payload carrying device.

As can readily be seen in FIG. 4, the payload carrying device 20, when connected with the vehicle 12, is substantially within the area defined by the vehicle 12. That is, with the exception of the leg supports 24 and the wheels 26, the payload carrying device 20 is positioned within the area defined by the front, back, and sides of the vehicle 12 and therefore requires only slightly more space than the area defined by the vehicle 12.

FIG. 4 also shows that the wheels 26 of the payload carrying device 20 may maintain contact with the floor even when connected with and transported by the vehicle 12. By maintaining contact with the floor, the weight of the payload carrying device 20 rests on the floor rather than on the vehicle 12. The payload carrying device 20 is then transported in accordance with the movement of the vehicle 12.

One of the many features of the invention is therefore a simple technique for transporting the payload carrying device 20 with the vehicle 12. By operating the apparatus 10 as described, the vehicle 12 may connect and disconnect with different payload carrying devices and without requiring complex lifting mechanisms.

Figure 5:
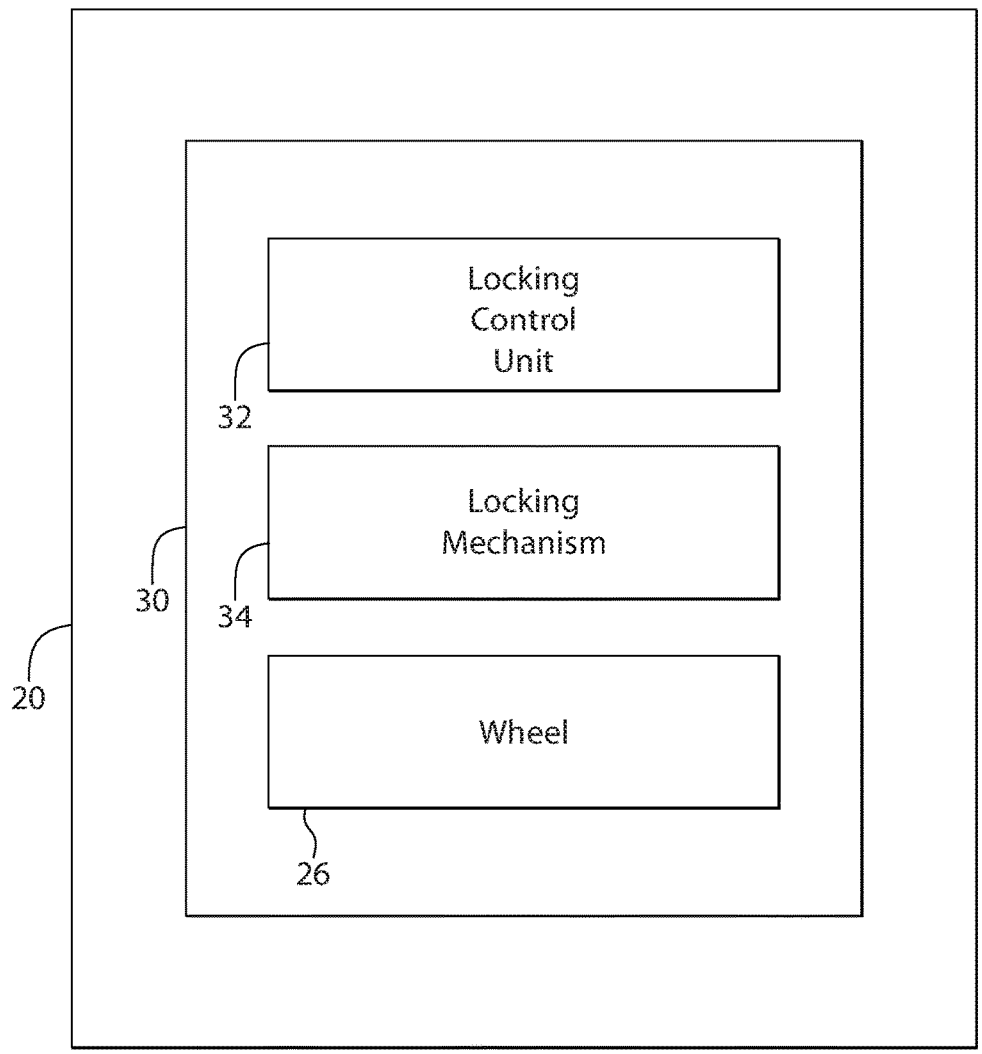
FIG. 5 generally illustrates a block diagram of a wheel locking system in accordance with one embodiment of the invention.

FIG. 5 generally illustrates a block diagram of a wheel locking system 30 that may be used to immobilize the payload carrying device 20 when disconnected from the vehicle 12 to prevent unwanted movement (due to uneven floors, for example). The wheel locking system 30 may include a locking control unit 32 and a locking mechanism 34 that is operably connected to at least one wheel 26 of the payload carrying device 20.

Briefly, in operation, the locking control unit 32 may operate the locking mechanism 34 to unlock the wheel 26 to enable movement of the payload carrying device 20 when connected with the vehicle 12. When the payload carrying device 20 is disconnected from the vehicle 12, the locking mechanism 34 may then lock the wheel 26.

Applicant contemplates a wide variety of locking mechanism 34 configurations that may be used to prevent unwanted movement of the payload carrying device 20. For example, the locking mechanism 34 may be a wheel lock that may be locked and unlocked electronically by signals from the locking control unit 32 or from the control unit 16.

Additionally and alternatively, the vehicle 12 may be configured to mechanically lock and unlock the locking mechanism 34 (such as when the vehicle 12 travels to and from the payload carrying device 20 and may physically maneuver the locking mechanism 34 by contact). The vehicle 12 may also be configured to place wedge-like devices near the wheels 26 once disconnected from the payload carrying device 20.

Although the description above contains many specific examples, these should not be construed as limiting the scope of the embodiments of the present disclosure but as merely providing illustrations of some of the preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A method of transporting a payload carrying device, comprising:
   providing at least one free standing payload carrying device;
   providing a free standing fully autonomous vehicle in the form of an autonomous mobile robot for at least transporting the at least one payload carrying device to any position within a desired facility;
   providing a connection device configured with at least one of the vehicle and the at least one payload carrying device for connecting the vehicle and the at least one payload carrying device with each other; and
   providing a control unit for:
      operating the connection device autonomously to connect the vehicle and the at least one payload carrying device where, once connected with each other, the vehicle autonomously transports the at least one payload carrying device to a desired location, and
      operating the connection device autonomously to disconnect the vehicle and the at least one payload carrying device at the desired location where, once disconnected from the vehicle, the at least one payload carrying device is immobilized.

2. The method as defined in claim 1, where the vehicle immobilizes the at least one payload carrying device when the vehicle and the at least one payload carrying device are disconnected at the desired location to prevent unwanted movement of the at least one payload carrying device.

3. The method as defined in claim 2, where the at least one payload carrying device includes a locking device, and the vehicle communicates a signal to the locking device to immobilize the at least one payload carrying device when the vehicle and the at least one payload carrying device are disconnected to prevent unwanted movement of the at least one payload carrying device.

4. The method as defined in claim 2, where the at least one payload carrying device includes a locking device, and the vehicle is configured to mechanically lock the locking device to immobilize at least one payload carrying device when the vehicle and the at least one payload carrying device are disconnected to prevent unwanted movement of the at least one payload carrying device.

5. The method as defined in claim 1, where a user may mobilize and manually transport the at least one payload carrying device when the vehicle and the at least one payload carrying device are disconnected from each other.

6. The method as defined in claim 1, where the vehicle travels, autonomously, to a position in which the vehicle and the at least one payload carrying device can be connected with each other before the connection device connects the vehicle and the at least one payload carrying device.

7. The method as defined in claim 1, where the vehicle mobilizes the at least one payload carrying device for transportation when the vehicle and the payload carrying device are connected with each other.

8. The method as defined in claim 1, where the connection device is selected from the group consisting of a hook, magnet, and rod-like device.

9. An apparatus for transporting a payload carrying device, comprising:
   at least one free standing payload carrying device;
   a free standing fully autonomous vehicle in the form of an autonomous mobile robot for at least transporting the at least one payload carrying device to any position within a desired facility;
   a connection device configured with at least one of the vehicle and the at least one payload carrying device for connecting the vehicle and the at least one payload carrying device with each other; and
   a control unit for:
      operating the connection device autonomously to connect the vehicle and the at least one payload carrying the device where, once connected with each other, the vehicle is configured to autonomously transport the at least one payload carrying device to a desired location; and
      operating the connection device autonomously to disconnect the vehicle and the at least one payload carrying device once at the desired location where, once disconnected from the vehicle, the at least one payload carrying device is immobilized.

10. The apparatus as defined in claim 9, where the vehicle immobilizes the at least one payload carrying device when the vehicle and the at least one payload carrying device are disconnected to prevent unwanted movement of the at least one payload carrying device.

11. The apparatus as defined in claim 10, where the at least one payload carrying device includes a locking device, and the vehicle communicates a signal to the locking device to immobilize the at least one payload carrying device when the vehicle and the at least one payload carrying device are disconnected to prevent unwanted movement of the at least one payload carrying device.

12. The apparatus as defined in claim 10, where the at least one payload carrying device includes a locking device, and the vehicle is configured to mechanically lock the locking device to immobilize at least one payload carrying device when the vehicle and the at least one payload carrying device are disconnected to prevent unwanted movement of the at least one payload carrying device.

13. The apparatus as defined in claim 9, where a user may mobilize and manually transport the at least one payload carrying device when the vehicle and the at least one payload carrying device are disconnected from each other.

14. The apparatus as defined in claim 9, where the vehicle may travel autonomously to a position in which the vehicle and the at least one payload carrying device can be connected with each other before operating the connection device to connect the vehicle and the at least one payload carrying device.

15. The apparatus as defined in claim 9, where the vehicle mobilizes the at least one payload carrying device for transportation when the vehicle and the payload carrying device are connected with each other.

16. The apparatus as defined in claim 9, where the connection device is selected from the group consisting of a hook, magnet, and rod.

17. A method of transporting a payload carrying device, comprising:
- providing at least one payload carrying device having a plurality of leg supports in contact with the floor;
- providing a fully autonomous vehicle in the form of an autonomous mobile robot for at least transporting the at least one payload carrying device to any position within a desired facility;
- providing a connection device configured with at least one of the vehicle and the at least one payload carrying device for connecting the vehicle and the at least one payload carrying device with each other; and
- providing a control unit for:
  - operating the connection device autonomously to connect the vehicle and the at least one payload carrying device where, once connected with each other, the vehicle autonomously transports the at least one payload carrying device to a desired location, and
  - operating the connection device autonomously to disconnect the vehicle and the at least one payload carrying device at the desired location where, once disconnected from the vehicle, the at least one payload carrying device is immobilized and when the vehicle and the at least one payload carrying device are connected with each other, the leg supports of the at least one payload carrying device are in contact with the floor so the at least one payload carrying device's weight rests on the floor rather than on the vehicle when the at least one payload carrying device is being transported to the desired location.

18. The method as defined in claim 17, where the at least one payload carrying device includes a plurality of wheels connected to the plurality of leg supports and are in contact with the floor when the at least one payload carrying device is being transported to the desired location.

19. An apparatus for transporting a payload carrying device, comprising:
- at least one payload carrying device having a plurality of leg supports in contact with the floor;
- a fully autonomous vehicle in the form of an autonomous mobile robot for at least transporting the at least one payload carrying device to any position within a desired facility;
- a connection device configured with at least one of the vehicle and the at least one payload carrying device for connecting the vehicle and the at least one payload carrying device with each other; and
- a control unit for:
  - operating the connection device autonomously to connect the vehicle and the at least one payload carrying the device where, once connected with each other, the vehicle is configured to autonomously transport the at least one payload carrying device to a desired location; and
  - operating the connection device autonomously to disconnect the vehicle and the at least one payload carrying device once at the desired location where, once disconnected from the vehicle, the at least one payload carrying device is immobilized and when the vehicle and the at least one payload carrying device are connected with each other, the leg supports of the at least one payload carrying device are in contact with the floor so the at least one payload carrying device's weight rests on the floor rather than on the vehicle when the at least one payload carrying device is being transported to the desired location.

20. The apparatus as defined in claim 19, where the at least one payload carrying device includes a plurality of wheels connected to the plurality of leg supports and are in contact with the floor when the at least one payload carrying device is being transported to the desired location.

* * * * *